A. T. DAWSON & G. T. BUCKHAM.
BREECH LOADING ORDNANCE.
APPLICATION FILED MAR. 11, 1911.
1,032,591.
Patented July 16, 1912.
4 SHEETS—SHEET 1.
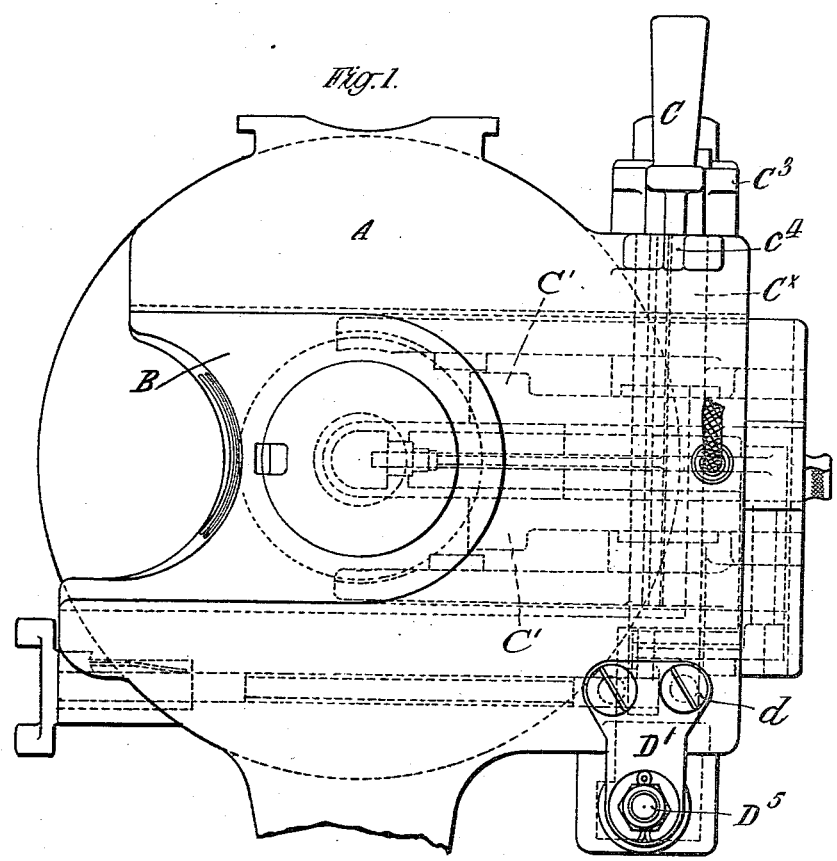

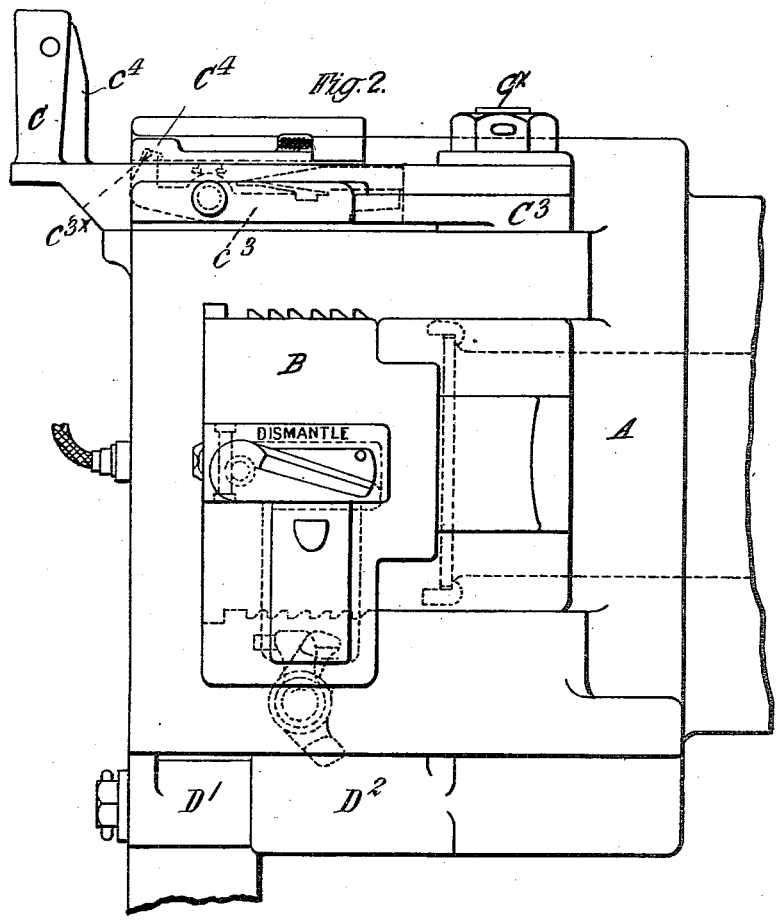

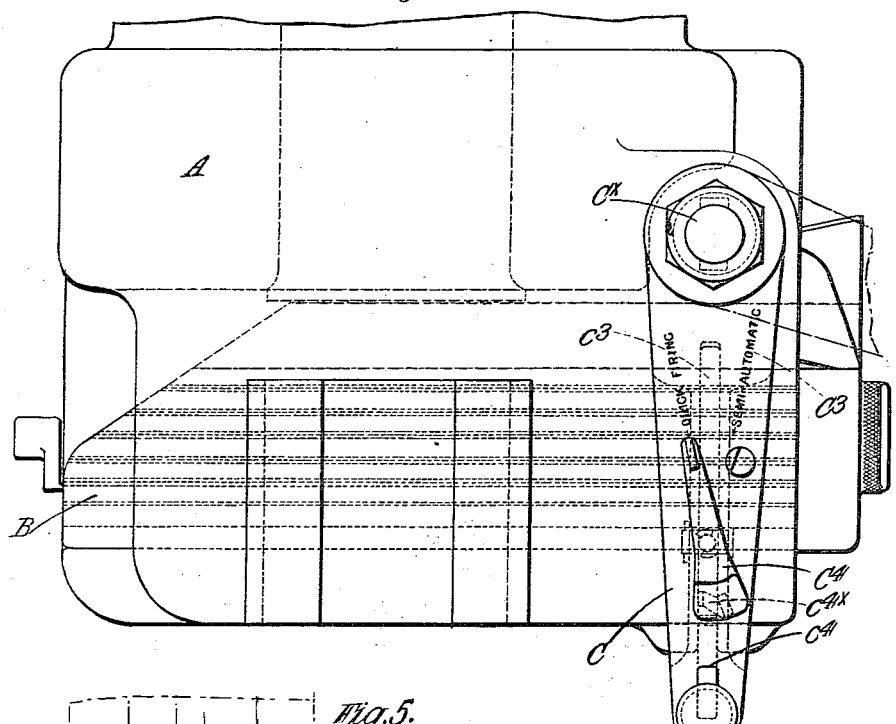
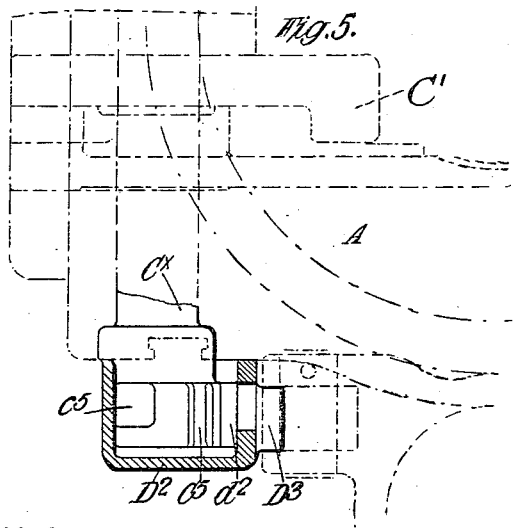
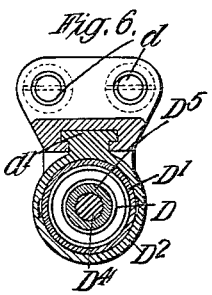

A. T. DAWSON & G. T. BUCKHAM.
BREECH LOADING ORDNANCE.
APPLICATION FILED MAR. 11, 1911.
1,032,591.
Patented July 16, 1912.
4 SHEETS—SHEET 4.
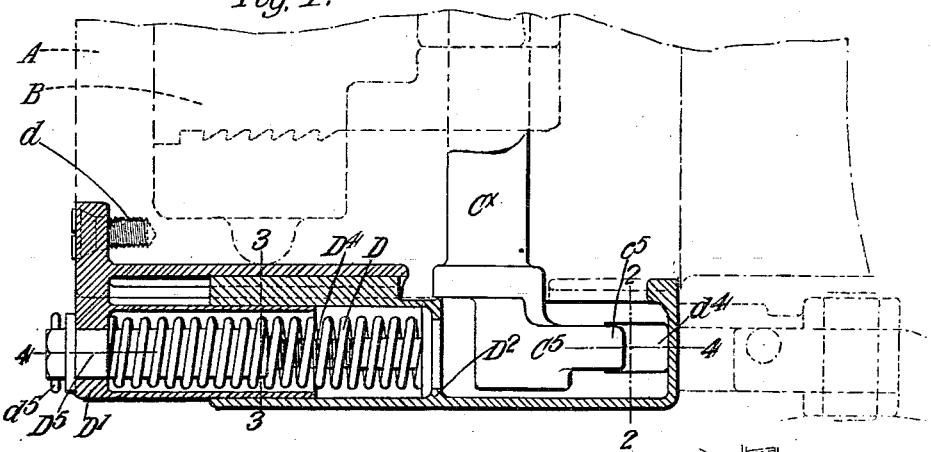
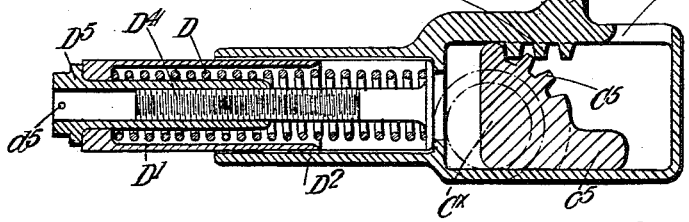
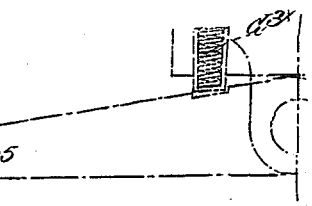
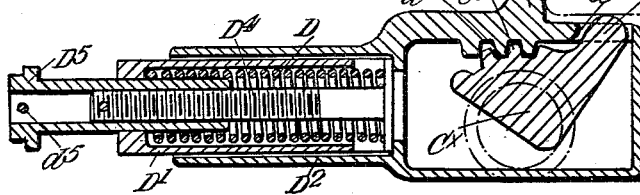
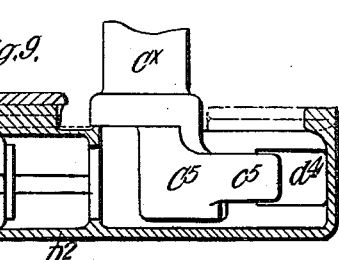

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS, LIMITED, OF WESTMINSTER, ENGLAND.

BREECH-LOADING ORDNANCE.

1,032,591.  Specification of Letters Patent.  Patented July 16, 1912.

Application filed March 11, 1911. Serial No. 613,805.

*To all whom it may concern:*

Be it known that we, ARTHUR TREVOR DAWSON, knight, and GEORGE THOMAS BUCKHAM, both subjects of the King of Great Britain, residing at 32 Victoria street, Westminster, in the county of London, England, have invented certain new and useful Improvements in and Relating to Breech-Loading Ordnance, of which the following is a specification.

This invention relates to breech loading ordnance of the semi-automatic type in which the breech block is opened and closed by a casing having rack teeth gearing with a toothed segment on the block actuating spindle, the casing containing a helical spring and being under the control of a pawl or the like carried by the cradle, so that on the run out of the gun the casing is displaced to open the breech and the helical spring thereby energized and cocked, the said spring when released serving to displace the toothed casing in the reverse direction to close the breech.

According to this invention the semi-automatic gear comprises a telescopic casing containing the spring, and having a hollow or box-like extension that incloses a toothed segment on the block actuating spindle, the said casing also having a projection with which the hinged pawl engages to operate the casing and energize the spring until released by means of a tripping piece on the toothed segment.

In order that the said invention may be clearly understood and readily carried into effect we will describe the same more fully with reference to the accompanying drawings in which:—

Figure 1 is a rear view of a gun provided with our improvements. Fig. 2 is a side view, and Fig. 3 is a plan of Fig. 1. Fig. 4 is a sectional elevation of the semi-automatic gear. Fig. 5 is a vertical section on the line 2, 2, of Fig. 4. Fig. 6 is a vertical section on the line 3, 3, of Fig. 4. Fig. 7 is a horizontal section on the line 4, 4, of Fig. 4, and Fig. 8 is a view similar to the preceding figure, but showing the parts in their relative positions when the tripping piece on the toothed segment is in the act of displacing the pawl. Fig. 9 is a view similar to Fig. 4, but showing the actuating spring adjusted to act as a buffer during quick firing as aforesaid.

In these figures A is the breech end of the gun, B is the breech block, C is the breech actuating hand lever, C' is the crank for moving the breech block, and $C^x$ is the spindle carrying the hand lever C.

D is the helical spring which is contained within a casing composed of two telescopically arranged portions $D', D^2$. The portion $D'$ is fixed in a dovetailed groove formed in the underside of the breech ring and is rigidly secured in place by means of screws $d$. The portion $D^2$ is of larger diameter than the portion $D'$ and is free to move over the latter in suitable guides $d'$. The said outer portion $D^2$ is of box section at one end (as shown in cross section in Fig. 5) and is formed with an internal rack $d^2$ (Figs. 5 and 7) which engages with an internally arranged toothed segment $C^5$ on the actuating spindle $C^x$. On the outer side of the said casing $D^2$ is the projection $D^3$ which is engaged by the spring controlled pawl $d^3$ (Fig. 7) pivoted on the mounting. A radial tripping piece $c^5$ is formed on the toothed segment $C^5$ as aforesaid and is so arranged that it can project through an opening $d^4$ in the casing $D^2$ to disengage the pawl $d^3$ from the projection $D^3$ when sufficient movement has been given to the spindle $C^x$. A screw-threaded bolt $D^4$ and sleeve $D^5$ is provided for regulating the compression of the spring D and also for retaining the said spring in the position shown in Fig. 9 to act as a buffer during quick firing as will be hereinafter described. The whole of this semi-automatic gear recoils with the gun.

The upper end of the hand lever spindle $C^x$ is formed to receive a keyed sleeve $C^3$ (Figs. 1, 2 and 3) which intervenes between the said spindle and the hand lever C. The hand lever C is mounted on the said sleeve, on the upper projecting part of the spindle or on a parallel extension of the nut securing the said spindle, and is caused to engage with it by means of a spring catch $c^3$ which is put in and out of gear with the sleeve $C^3$ by an indicator lever $C^4$ by the coöperation of a cam surface $c^{4x}$ (Fig. 3) on the lever $C^4$ with a projection $c^{3x}$ on the catch $c^3$. When the said catch $c^3$ is in gear the hand lever C can operate the mechanism for quick fire, or for the first operation in opening the mechanism when firing semi-automatically. When the said catch is out of gear, the hand lever is secured to the gun by a positive catch $c^4$ which can be released by grasping the said hand lever. When the gun is being worked semi-automatically the catch $c^3$ occupies a position in which it disengages the breech actuating hand lever from the spindle $C^x$. When the gun recoils after firing, the pawl $d^3$ on the mounting is pressed by its spring $d^{3x}$ (Fig. 7) into such a position as to engage with the projection $D^3$ on the outer casing $D^2$ as the gun returns to the run-out position. In so doing, it compresses the actuating spring D, and rotating the actuating spindle $C^x$ by means of the aforesaid rack $d^2$ and segment $C^5$, throws the breech mechanism open. The tripping piece $c^5$ on the toothed segment $C^5$ now disengages the pawl $d^3$ from the projection $D^3$ this operation being arranged to take place before the gun is fully run out; the additional movement of the gun carries the projection $D^3$ past the end of the pawl, thus returning the pawl to its original position as shown in Fig. 7.

To adapt the gear for quick firing the catch $c^3$ is engaged with the sleeve $C^3$ and therefore with actuating spindle $C^x$ whereby the breech actuating hand lever is locked to the said spindle $C^x$. The block is then moved into its open position by the said hand lever, the effect of this movement being to compress the actuating spring D and move the aforesaid spring regulating sleeve $D^5$ beyond the fixed spring casing $D'$. The said sleeve is then screwed back upon its bolt $D^4$ till the end of the said bolt is flush with the end of the sleeve as shown in Fig. 9. A split pin $d^5$ is then passed through the bolt and the sleeve and thus prevents any relative movement between the two parts. During the subsequent operation of the mechanism by the hand lever in opening the breech, the spring D acts as a buffer to slightly return the breech block into such a position as to require it to be dislodged by the cartridge case when loading, the reaction of the spring causing the block to rebound and come behind the cartridge case when the latter is home, thus preventing it from falling out when the gun is loaded at elevation as is well understood.

What we claim and desire to secure by Letters Patent of the United States is:—

1. In breech actuating mechanism, the combination with a block actuating spindle, an actuating spring, a toothed segment on the block actuating spindle, a casing containing the actuating spring, and a hinged pawl adapted to engage with said casing; of a hollow extension of the said casing adapted to inclose the toothed segment, internal rack teeth formed on said extension and engaging with said segment, and means for liberating the said pawl from the casing as the segment completes its angular movement in opening the breech.

2. In breech actuating mechanism, the combination with a block actuating spindle, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and means carried by the said toothed segment for liberating the said pawl from the casing.

3. In breech actuating mechanism, the combination with a block actuating spindle, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and a projection on the said toothed segment for liberating the said pawl from the casing.

4. In breech actuating mechanism, the combination with a block actuating spindle, an actuating spring, a toothed segment on the block actuating spindle, a casing containing the helical actuating spring and a hinged pawl adapted to engage with said casing, of a hollow extension of the said casing, adapted to inclose the toothed segment, internal rack teeth formed on the said extension and engaging with said segment, and a projection on the said toothed segment for liberating the said pawl.

5. In breech actuating mechanism, the combination with a block actuating spindle, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and means for adjusting the spring to act as a buffer during the opening of the breech.

6. In breech actuating mechanism, the combination with a block actuating spindle, an actuating spring, a toothed segment on the block actuating spindle, a casing containing the helical actuating spring, and a hinged pawl adapted to engage with said casing, of a hollow extension of the said casing adapted to inclose the toothed segment, internal rack teeth formed on the said extension and engaging with said segment, and means for adjusting the helical spring to act as a buffer during the opening of the breech.

7. In breech actuating mechanism, the combination with a block actuating spindle, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and means for disconnecting the breech actuating lever from the actuating spindle.

8. In breech actuating mechanism, the combination with a block actuating spindle, a breech actuating hand lever, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and means carried by the breech actuating hand lever for disconnecting the same from the actuating spindle.

9. In breech actuating mechanism, the combination with a block actuating spindle, a breech actuating hand lever, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, and a spring catch for connecting the breech actuating hand lever to the actuating spindle.

10. In breech actuating mechanism, the combination with a block actuating spindle, an actuating spring, a toothed segment on the block actuating spindle, a casing containing the actuating spring, and a hinged pawl adapted to engage with said casing, of a hollow extension of the said casing adapted to inclose the toothed segment, internal rack teeth formed on the said extension and engaging with said segment, a spring catch, and an indicator lever for moving said catch into or out of its connecting position with the actuating spindle.

In testimony whereof we affix our signatures in presence of two witnesses.

ARTHUR TREVOR DAWSON.
GEORGE THOMAS BUCKHAM.

Witnesses:
 HENRY KING,
 ERNEST E. LARKINS.

Copies of this patent may be obtained for five cents each, by addressing the "Commissioner of Patents, Washington, D. C."